US009713869B2

(12) United States Patent
Trompeter

(10) Patent No.: US 9,713,869 B2
(45) Date of Patent: Jul. 25, 2017

(54) CALIBRATION OF ROBOT WORK PATHS

(71) Applicant: Matthew E. Trompeter, Macomb, MI (US)

(72) Inventor: Matthew E. Trompeter, Macomb, MI (US)

( * ) Notice: Subject to any disclaimer, the term of this patent is extended or adjusted under 35 U.S.C. 154(b) by 0 days.

(21) Appl. No.: 14/818,205

(22) Filed: Aug. 4, 2015

(65) Prior Publication Data
US 2016/0184994 A1    Jun. 30, 2016

Related U.S. Application Data

(63) Continuation-in-part of application No. 14/724,966, filed on May 29, 2015, which is a continuation-in-part of application No. 14/710,933, filed on May 13, 2015, which is a continuation-in-part of application No. 14/155,646, filed on Jan. 15, 2014, now abandoned, which is a continuation-in-part of application No. PCT/US2013/000146, filed on Jun. 10, 2013, which is a continuation-in-part of application No. 13/385,797, filed on Mar. 7, 2012, now Pat. No. 9,061,421.

(51) Int. Cl.
*B25J 9/16* (2006.01)

(52) U.S. Cl.
CPC ... *B25J 9/1692* (2013.01); *G05B 2219/39033* (2013.01); *Y10S 901/02* (2013.01)

(58) Field of Classification Search
None
See application file for complete search history.

(56) References Cited

U.S. PATENT DOCUMENTS

| | | | |
|---|---|---|---|
| 7,359,817 B2 * | 4/2008 | Ban | B25J 9/1692 356/2 |
| 2009/0157226 A1 * | 6/2009 | de Smet | B25J 9/1692 700/254 |
| 2012/0265341 A1 * | 10/2012 | Trompeter | B25J 9/1692 700/254 |
| 2012/0283874 A1 * | 11/2012 | Trompeter | B25J 9/1692 700/254 |

* cited by examiner

*Primary Examiner* — Robert R Raevis
(74) *Attorney, Agent, or Firm* — Gerald R. Black, Esq.

(57) ABSTRACT

The calibration device combines a work object with an industrial robot and a robot tool. The work object uses a pair of beam projecting lasers and three plane projecting lasers, the laser beams intersecting at a laser intersecting point. The laser intersection point of the laser beams and laser planes represent the location of the reference coordinate system which is selected to be the origin of the robot path being downloaded from the off-line programming. Once this off-line programming is created, the work object is placed onto the fixture on the manufacturing shop floor in the same place as the CAD environment. The user then manipulates the TCP into position of the laser intersection point and the laser planes. The robot is then manipulated down a first laser with the TCP recording a second point along a first laser beam and recording a third point along the opposing laser beam.

20 Claims, 24 Drawing Sheets

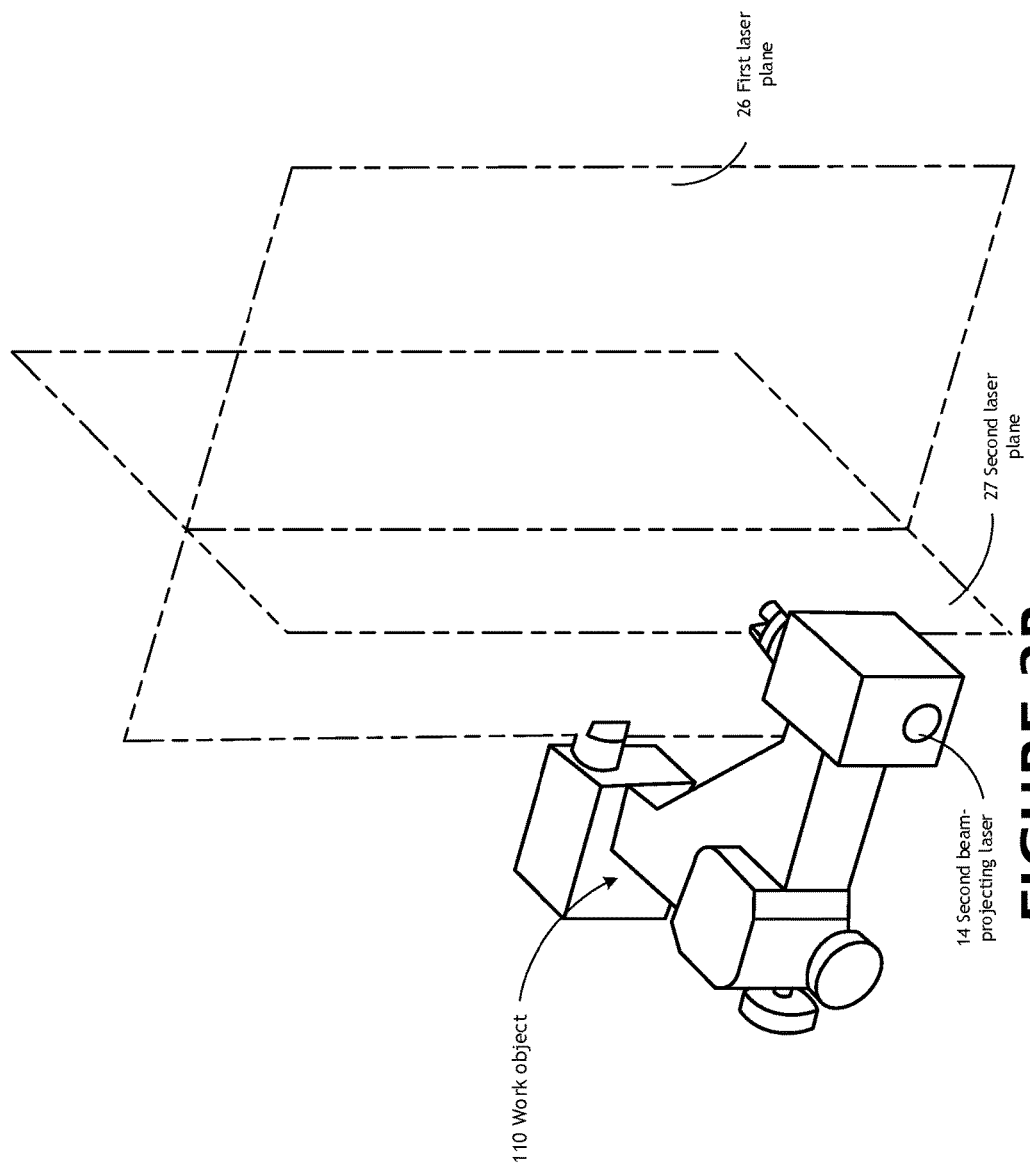

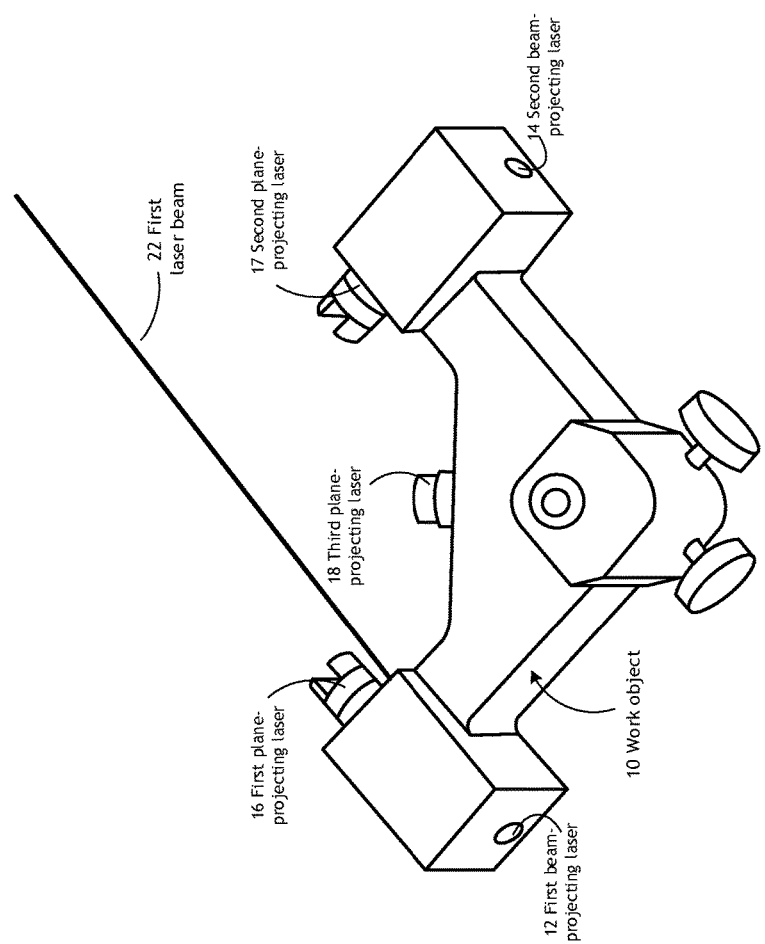

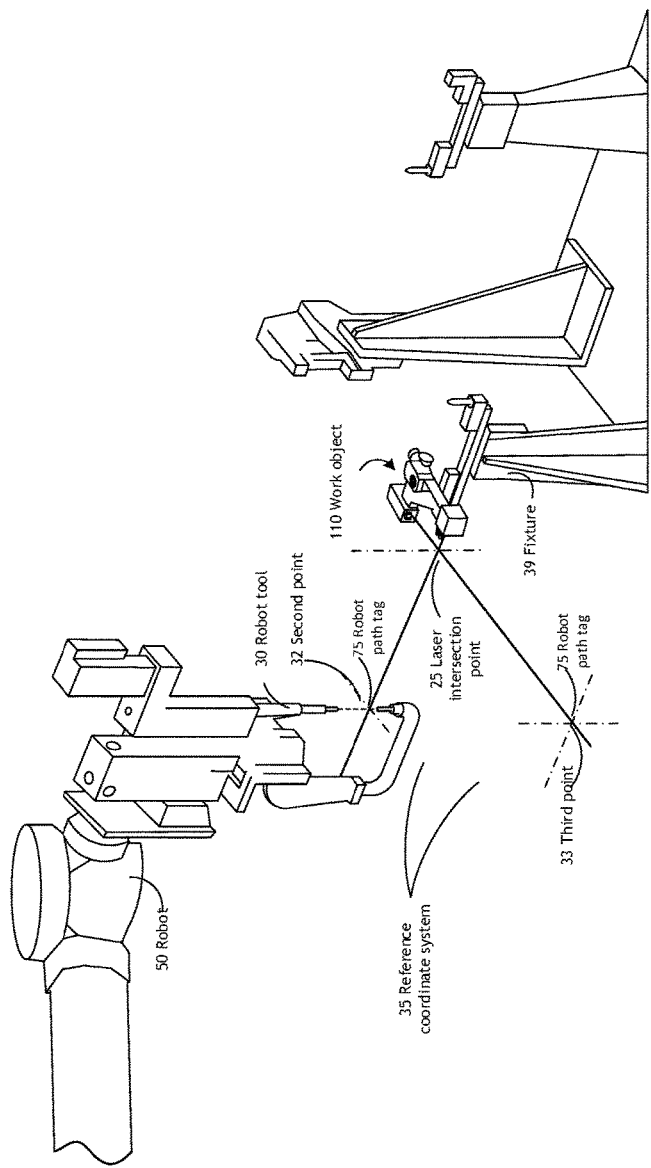

CALIBRATION OF ROBOT WORK PATHS

CROSS-REFERENCE TO RELATED APPLICATIONS

This application is a continuation-in-part to and claims priority to U.S. Ser. No. 14/724,966, entitled "ROBOTIC WORK OBJECT CELL CALIBRATION METHOD," filed on May 29, 2015, U.S. Ser. No. 14/710,933, entitled "CALIBRATION FOR ROBOTIC SYSTEMS," (Trompeter) filed on May 13, 2015, U.S. Ser. No. 14/155,646, entitled "ROBOT CALIBRATION SYSTEMS," (Trompeter) filed on Jan. 15, 2014, PCT Application No. PCT/US2013/00146, entitled "AUTOMATIC AND MANUAL ROBOT WORK FINDER CALIBRATION SYSTEMS AND METHODS", (Trompeter) filed on Jun. 10, 2013, U.S. Ser. No. 13/385, 797, entitled "ROBOTIC WORK OBJECT CELL CALIBRATION METHOD," (Trompeter) filed on Mar. 7, 2012, U.S. Ser. No. 13/385,091, entitled "ROBOTIC WORK OBJECT CELL CALIBRATION SYSTEM," (Trompeter), filed on Feb. 1, 2012, U.S. Provisional Application No. 61/518,912, entitled "ROBOTIC WORK OBJECT CELL CALIBRATION SYSTEM AND METHOD," (Trompeter) filed on May 13, 2011, and U.S. Provisional Application No. 61/465,080, entitled "ROBOTIC WORK OBJECT CELL CALIBRATION SYSTEM AND METHOD," (Trompeter) filed on Mar. 14, 2011, all of which are incorporated by reference herein.

FIELD OF USE

The present invention relates to a calibration device, system, and method for an industrial robot and, more particularly, for calibration of the robot work paths on a manufacturing shop floor.

BACKGROUND OF THE INVENTION

The value of industrial robots has historically been driven by the automotive industry. However, that value is now being realized in other industries, as robots are being designed for tasks as diverse as cleaning sewers, detecting bombs, and performing intricate surgery. The number of industrial robots sold globally in 2013 was nearly 180,000 units, essentially tripling the number of units sold in 2009, with the automotive, metal, and electronics industries driving the growth.

Prior approaches to calibrating industrial robots use measuring devices either determine the inaccuracies of the robots after the robot is built, or measure work piece positions relative to the robots' positions prior to off-line programming.

Some of the prior art includes:

U.S. Pat. No. 8,651,858 (Berckmans, et al.) discloses a method of creating a 3-D anatomic digital model for determining a desired location for placing at least one dental implant in a patient's mouth. One such method uses a calibration device that involves two intersecting lasers to place a dental implant into a cast model of a patient's mouth. The lasers are not mounted onto a fixture since the fixture-to-robot location is known. The method creates a 3-D anatomic digital model for determining a desired location for placing at least one dental implant in the mouth of a patient.

U.S. Pat. No. 7,979,159 (Fixell) discloses a method and a system for determining the relation between a local coordinate system located in the working range of an industrial robot and a robot coordinate system. The method includes attaching a first calibration object in a fixed relation to the robot and determining the position of the first calibration object in relation to the robot. Then, locating at least three second calibration objects in the working range of the robot, a reference position for each of the second calibration objects in the local coordinate system can be determined by moving the robot until the first calibration object is in mechanical contact with each second calibration object. By reading the position of the robot when the calibration objects are in mechanical contact the relation between the local coordinate system and the robot coordinate system can be calculated.

U.S. Pat. No. 7,945,349 (Svensson, et al.) discloses an invention which relates to a method and a system for facilitating calibration of a robot cell. One or more objects and an industrial robot perform work in connection to the objects, wherein the robot cell is programmed by means of an off-line programming tool including a graphical component for generating 2D or 3D graphics based on graphical models of the objects. The system comprises a computer unit located at the off-line programming site and configured to store a sequence of calibration points for each of the objects, and to generate a sequence of images including graphical representations of the objects to be calibrated and the calibration points in relation to the objects, and to transfer the images to the robot, and that the robot is configured to display the sequence of images to a robot operator during calibration of the robot cell so that for each calibration point a view including the present calibration point and the object to be calibrated are displayed for the robot operator.

U.S. Pat. No. 7,756,608 (Brogardh) discloses a method for calibrating an industrial robot including a plurality of movable links and a plurality of actuators effecting movement of the links and thereby the robot. The method includes mounting a measuring tip on or in the vicinity of the robot, moving the robot such that the measuring tip is in contact with a plurality of measuring points on the surface of at least one geometrical structure on or in the vicinity of the robot, reading and storing the positions of the actuators for each measuring point, and estimating a plurality of kinematic parameters for the robot based on a geometrical model of the geometrical structure, a kinematic model of the robot, and the stored positions of the actuators for the measuring points.

What is needed is a robot calibration system for use with industrial robots to improve cost and time factors in applications where absolutely accurate robots are not really necessary. Examples include body-in-white applications, resistance welding, material handling, and MIG welding.

Also, what is needed is a robot calibration system that covers a larger surface area, thereby providing improved accuracy for the user.

The primary objective of the robot calibration system of the present invention is to provide a calibration system that is simpler to operate, results in improved precision, involves a lower investment cost, and entails lower operating costs in a manufacturing environment.

SUMMARY OF THE INVENTION

The robot calibration system of the present invention address these needs and objectives.

The first preferred embodiment of the calibration system of the present invention comprises means for emitting a pair of lasers beams and three laser plane. The lasers are mounted so that the laser beams intersect at a 90 degree angle. Alternatively, the calibration system of the present invention requires that the beam-projecting lasers are mounted so that the laser beams intersect at a range of angles from between 85 degrees and 95 degree relative to each other, at a laser intersection point. The laser intersection point defines the location of a reference coordinate system.

Preferable, the first laser plane is coplanar with the x-plane, the second laser plane is coplanar with the y-plane and the third laser plane is coplanar with the z-plane. The first laser plane enables adjustment of Rx angular position of the robot tool, the second laser plane enables adjustment of Ry angular position of said robot tool, and the third laser plane enables adjustment of Rz angular position of the robot tool.

The geometry of the work object is preferably enables the beam projecting lasers to be mounted in an L-shaped member. The angular positions of a robot tool are adjustable relative to the reference coordinate system.

In one preferred embodiment the calibration system of the present invention, the work object includes two lasers positioned onto a work piece or tool, at a known location (a numerical control block or NAAMS mounting pattern) with the two laser beams intersecting at a 90 degree angle and continuing to project outward.

In order to calibrate off-line programming, the work object is placed into a robotic simulation CAD software system. The user selects the location of the device and which is typically placed on a standard NAAMS block or pin in the tool or fixture the robot is interacting with. The laser intersection point and laser planes represent the location of the reference coordinate system. This frame is selected to be the origin of the robot path being downloaded from the off-line programming. Once this off-line programming is created, the device is then placed onto the fixture on the shop floor in the same place as the CAD environment. The user then manipulates the tool center point of the robot into position of the laser intersection point. The laser intersection point is recorded. The robot is then manipulated down the first laser beam with the tool center point of the robot recording the "X" elongator of the reference coordinate system recording a second point in the robot. A third point is then recorded repeating the process of the second point along the second laser beam. Once all three (3) points are known, the reference coordinate system is generated.

The robotic calibration device of the present invention can be used to move existing robotic equipment without re-teaching the robots path once moved into the robot and tooling desired location. The robotic calibration device is placed anywhere onto a fixture on the shop floor or manufacturing environment where the robot is able to reach and clear of obstruction so that the tool center point of the robot can be manipulated into the laser intersection point. This position is recorded using the tool center point of the robot. The laser planes are then transferred onto the robots tool (a weld gun, a torch, an end effector, an Mig welder, or the like) with some sort of a marker, pencil, or scribing tool. Once the robot or adjacent tooling is moved to a desired location, the tool center point of the robot is then again manipulated into the laser intersection point and the scribe lines, marker or pencil markings are then repositioned relative to the laser planes. A position is then recorded and compared to the first. The difference is then entered into the robot and the path is recalibrated.

This technology enables the user to visually see the reference coordinate system, the frame in space that is relative to an industrial robot and work piece tool that is otherwise abstract and cannot be seen. Enabling the user to visually see the reference coordinate system on the manufacturing shop floor will enable the user to adjust the robotic frame to the manufacturing shop floor environment and, thereby, correct a robotic path or off-line program to obtain accuracy.

As used herein, the tool center point of the robot (TCP) refers to the position of the robot and its movements are always related to the tool center point. The tool center point of the robot (TCP) is generally the location on the end effector or tool of a robot manipulator whose position and orientation define the coordinates of the controlled object.

While a weld gun is depicted in these drawings for purposes of consistency and illustration only, it will be readily appreciated by one having ordinary skill in the art that the teachings disclosed herein apply to any or all robot tools (such as, for purposes of non-limiting examples, a machine nozzle, a sealing gun, an arc welding torch, that are used in conjunction with a robot on a manufacturing shop floor).

For a complete understanding of the robot calibration system of the present invention, reference is made to the following detailed description and accompanying drawings in which the presently preferred embodiments of the invention are shown by way of example. As the invention may be embodied in many forms without departing from the spirit or essential characteristics thereof, it is expressly understood that the drawings are for purposes of illustration and description only, and are not intended as a definition of the limits of the invention.

BRIEF DESCRIPTION OF THE DRAWINGS

FIG. 3B depicts a perspective view of a second preferred embodiment of the work object of the present invention to calibrate a robot work path complete with two plane-projecting lasers and two beam projecting lasers complete with the two laser planes.

FIG. 8A is yet still another perspective view of the work object of FIG. 7, complete with three plane-projecting lasers and two beam projecting lasers, this view showing the first beam projecting laser on; FIG. 8B is yet still another perspective view of the work object of FIG. 7, complete with three plane-projecting lasers and two beam projecting lasers, this view showing the second beam projecting laser on.

FIG. 9 depicts another perspective view of the first preferred embodiment of the robot calibration system of the present invention to calibrate a robot work path, the system comprising a robot tool and a first preferred embodiment of a work object, the first beam projecting laser being on.

FIG. 11B depicts a second perspective view of the robot calibration system of FIG. 11A, with the work object of FIG. 1B still positioned on the fixture, with the robot tool being positioned at a second point along the axis of the first laser beam projected from the work object.

DETAILED DESCRIPTION OF THE PREFERRED EMBODIMENTS

Figure 1A:
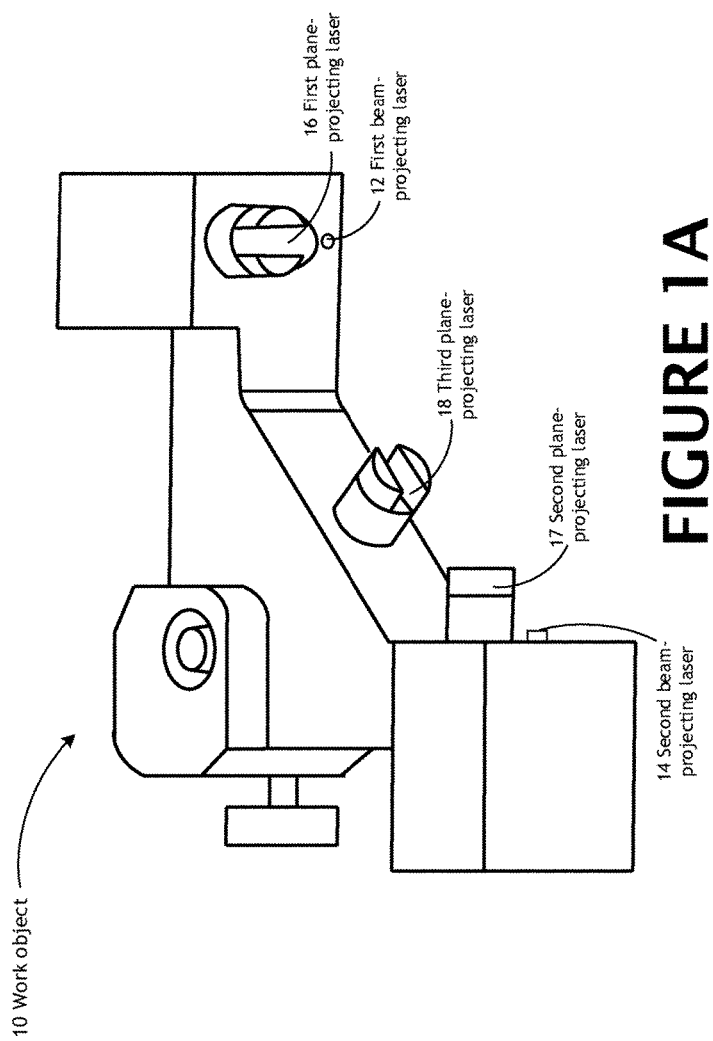
FIG. 1A depicts a perspective view of a first preferred embodiment of the work object of the present invention complete with three plane-projecting lasers and two beam projecting lasers.
Figure 1B:
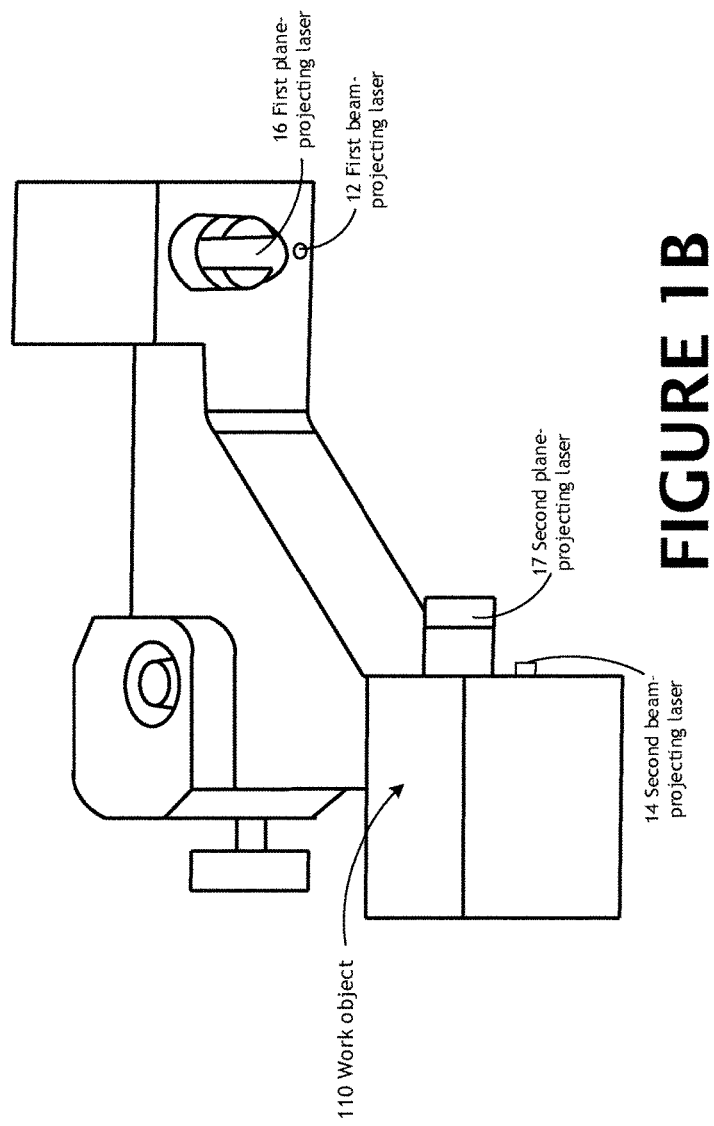
FIG. 1B depicts a perspective view of a second preferred embodiment of the work object of the present invention complete with two plane-projecting lasers and two beam projecting lasers.
Figure 2A:
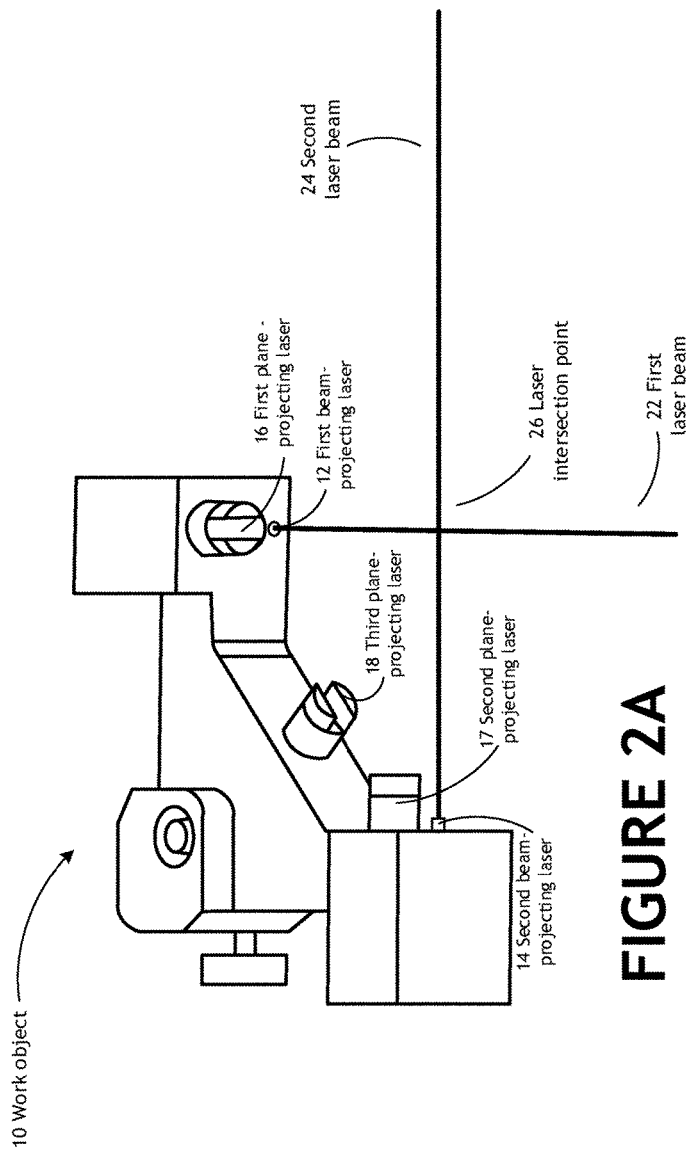
FIG. 2A depicts a perspective view of a first preferred embodiment of the work object of the present invention complete with three plane-projecting lasers complete with the two beam projecting lasers depicting two laser beams and a laser intersection point.
Figure 2B:
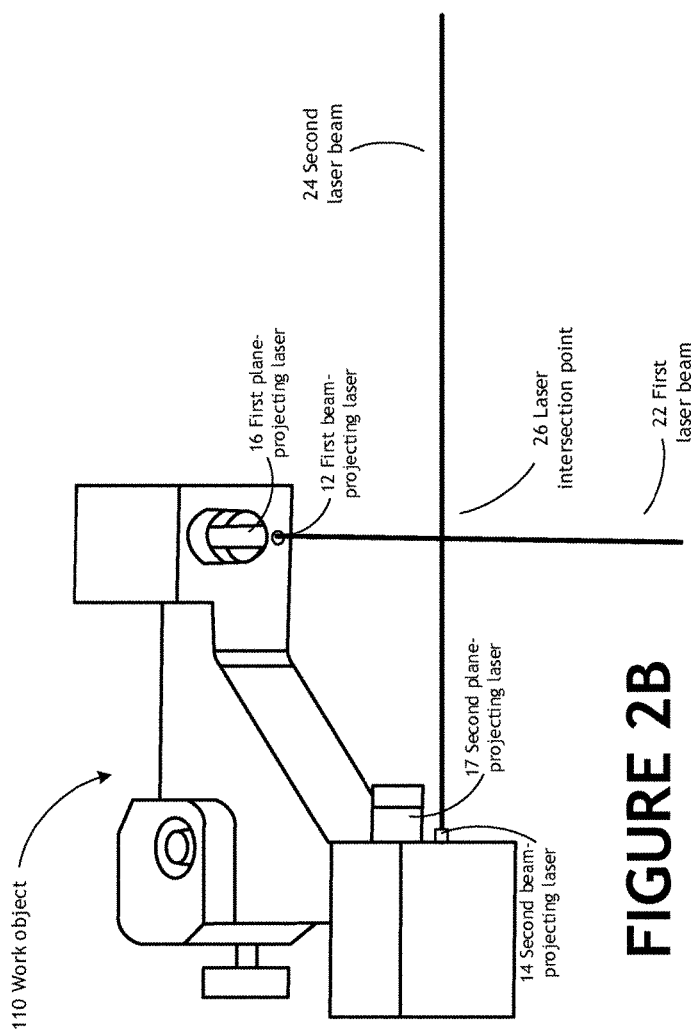
FIG. 2B depicts a perspective view of a second preferred embodiment of the work object of the present invention complete with two plane-projecting lasers and two beam projecting lasers complete with the two beam projecting lasers depicting two laser beams and a laser intersection point.

Referring now to the drawings, FIGS. 1A, 2A, 3A, 4A, 6, 7, 8A, 8B, and 8C depict a first preferred embodiment of the work object of the present invention [10] for calibrating a robot work path on a manufacturing shop floor relative to a robot tool.

The robot tool [10] includes a first beam-projecting laser [12] and a second beam-projecting laser [14], preferably mounted in a manner whereby the angle and position of each beam-projecting laser [12 and 14] is adjustable in the work object of the present invention [10] relative to each other. The angle of choice between the beam-projecting laser [12 and 14] is 90 degrees. The angle of the beam-projecting lasers [12 and 14] is also adjustable relative to a robot tool [30].

The first preferred embodiment of the robot tool [10] also includes three plane-projecting lasers [16], [17], and [18], each plane-projecting laser [16], [17], and [18] projecting a laser plane [26], [27], and [28]. Each plane-projecting laser [16], [17], and [18] is adjustable in the work object [10] relative to each other. Preferably, each of the laser planes [26], [27], and [28] is perpendicular to the other two.

FIGS. 1B, 2B, 3B, and 4B depict a second preferred embodiment of the work object of the present invention complete with two plane-projecting lasers and two beam projecting lasers.

The work object [10] includes a first beam-projecting laser [12] and a second beam-projecting laser [14], preferably mounted in a manner whereby the angle and position of each beam-projecting laser [12 and 14] is adjustable in the work object [10] relative to each other. The angle of choice between the beam-projecting laser [12 and 14] is 90 degrees. The angle of the beam-projecting lasers [12 and 14] is also adjustable relative to a robot tool [30].

The second preferred embodiment of the robot tool [110] also includes two plane-projecting lasers [16] and [17], each plane-projecting laser [16] and [17] projecting a laser plane [26] and [27]. Each plane-projecting laser [16] and [17] is adjustable in the work object [10] relative to each other. Preferably, the two laser planes [26] and [27] are perpendicular to each other.

Figure 3A:
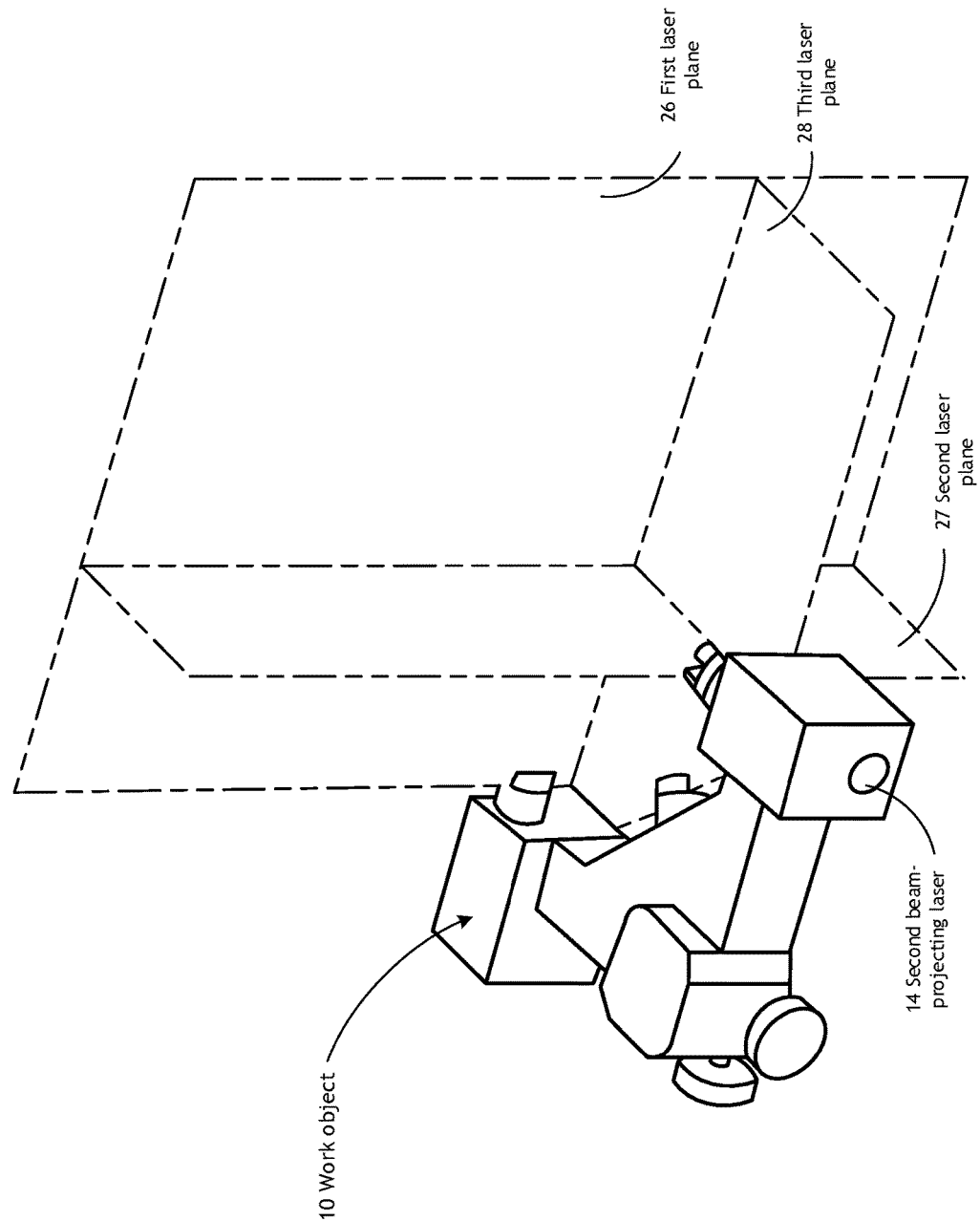
FIG. 3A depicts a perspective view of a first preferred embodiment of the work object of the present invention to calibrate a robot work path complete with three plane-projecting lasers and two beam projecting lasers complete with the three laser planes.
Figure 3C:
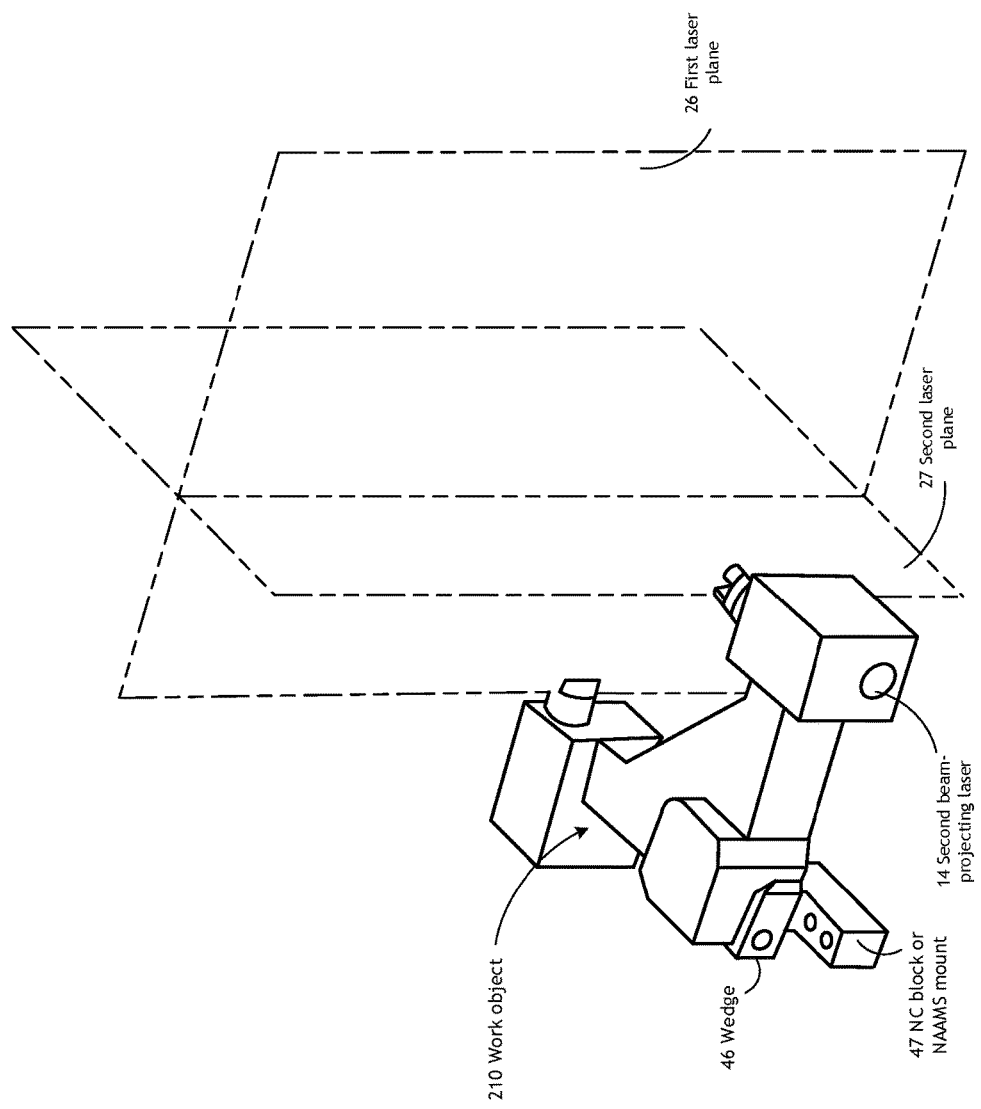
FIG. 3C depicts another perspective view of the second preferred embodiment of the work object of the present invention complete with two plane-projecting lasers and two beam projecting lasers complete with the two laser planes also showing for mounting on a numerical control block or a NAAMS mounting.
Figure 4A:
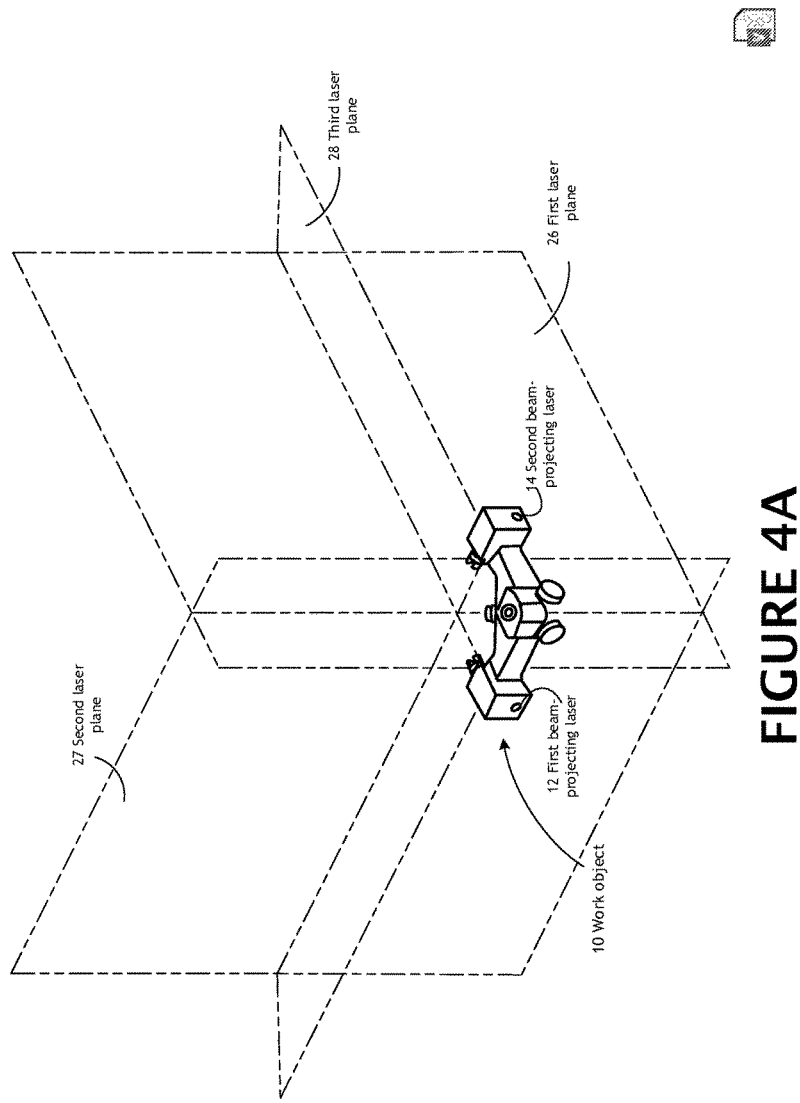
FIG. 4A is another depiction of the first preferred embodiment of the work object of the present invention to calibrate a robot work path complete with three plane-projecting lasers and two beam projecting lasers complete with the three laser planes.
Figure 4B:
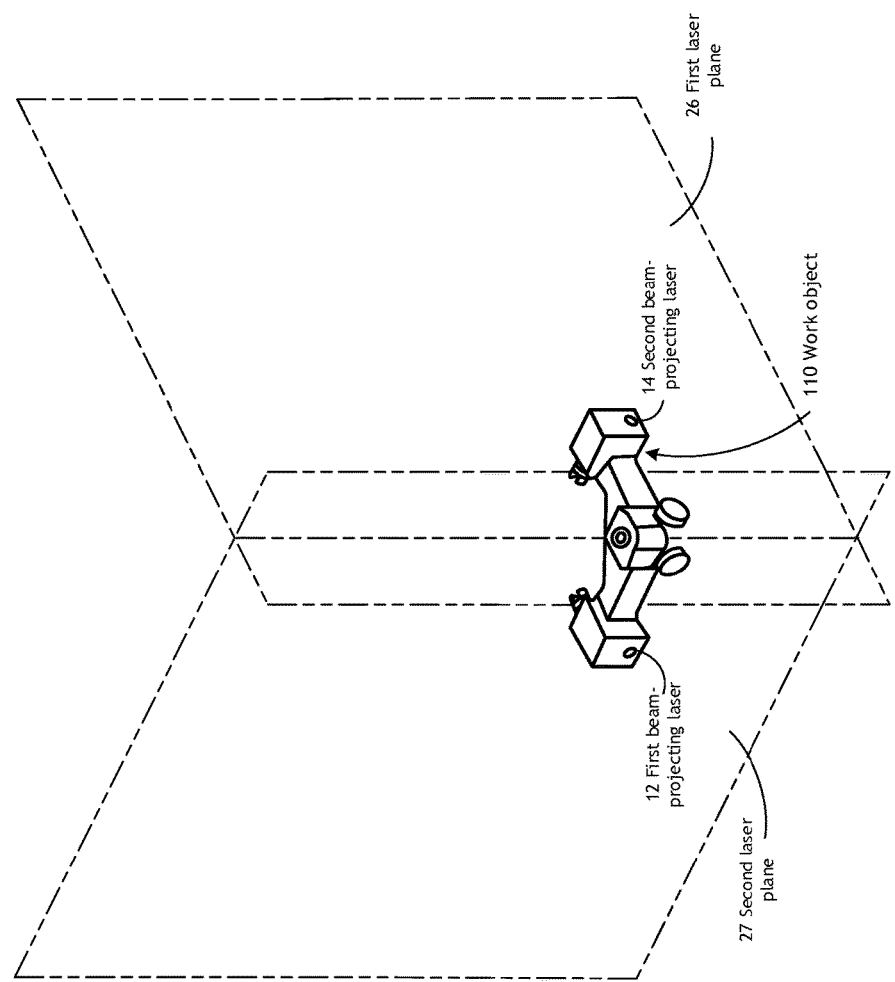
FIG. 4B is another depiction of the second preferred embodiment of the work object of the present invention complete with two plane-projecting lasers and two beam projecting lasers complete with the two laser planes.

FIG. 3C depicts another perspective view of the second preferred embodiment of the work object of the present invention [210] complete with two plane-projecting lasers [16 and 17] and two beam projecting lasers [12 and 14]. Also, shown is the mounting for a numerical control block or a NAAMS mounting. The mounting is preferably a numerical control numerical control block or a NAAMS mounting pattern [47], attached to the work object [210] with a wedge [46].

Figure 5A:
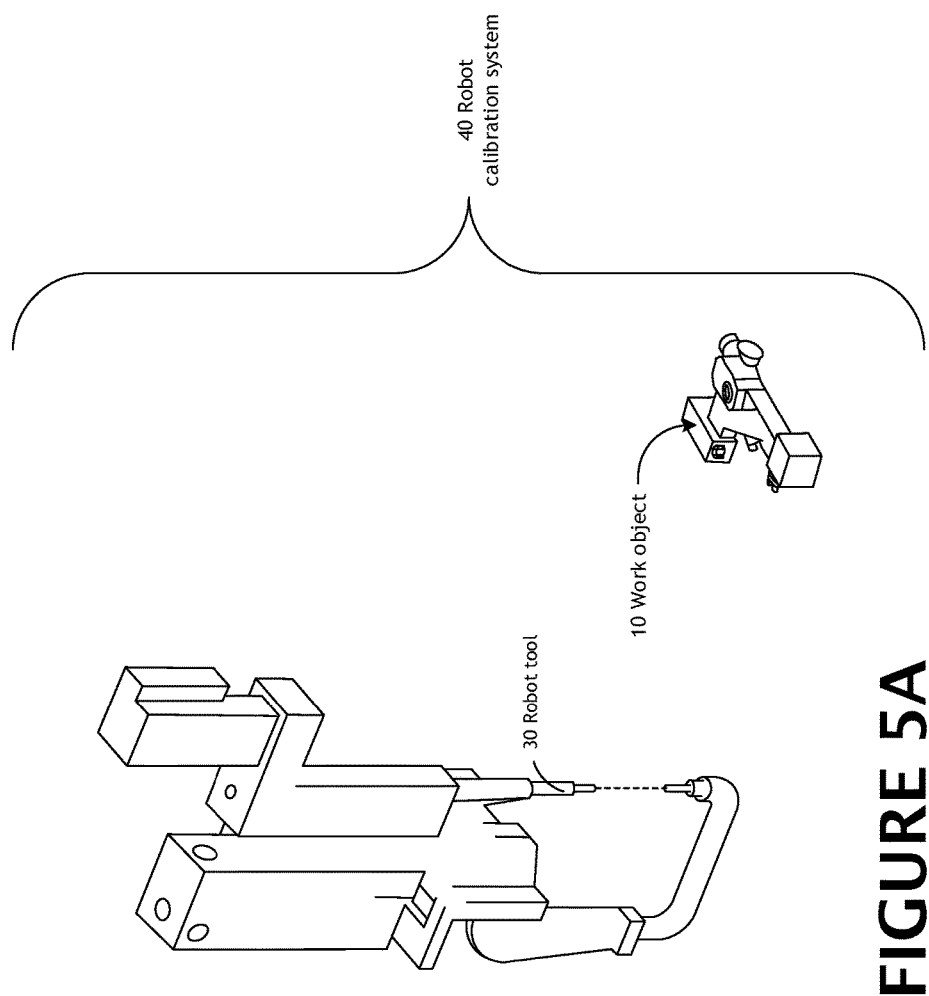
FIG. 5A depicts a perspective view of the first preferred embodiment of the robot calibration system of the present invention, the system comprising a robot tool and the work object of FIG. 1A.
Figure 5B:
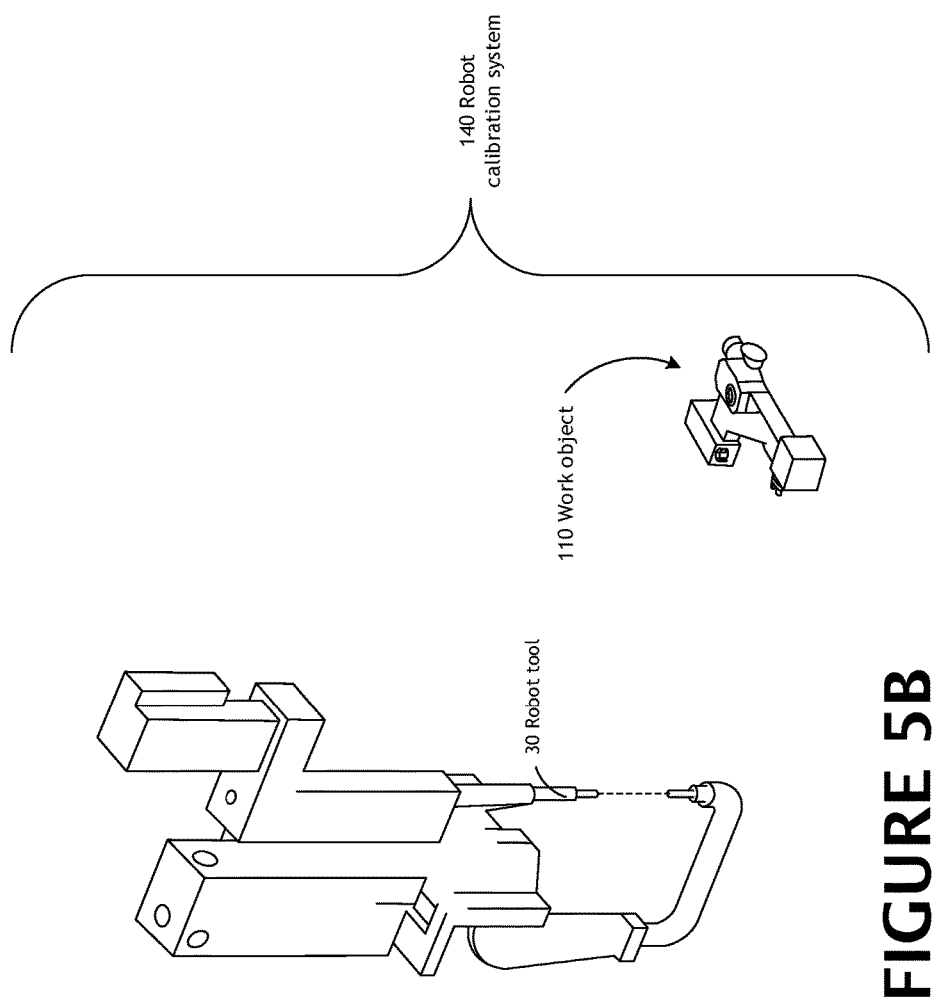
FIG. 5B depicts a perspective view of the second preferred embodiment of the robot calibration system of the present invention, the system comprising a robot tool and the work object of FIG. 1B.
Figure 6:
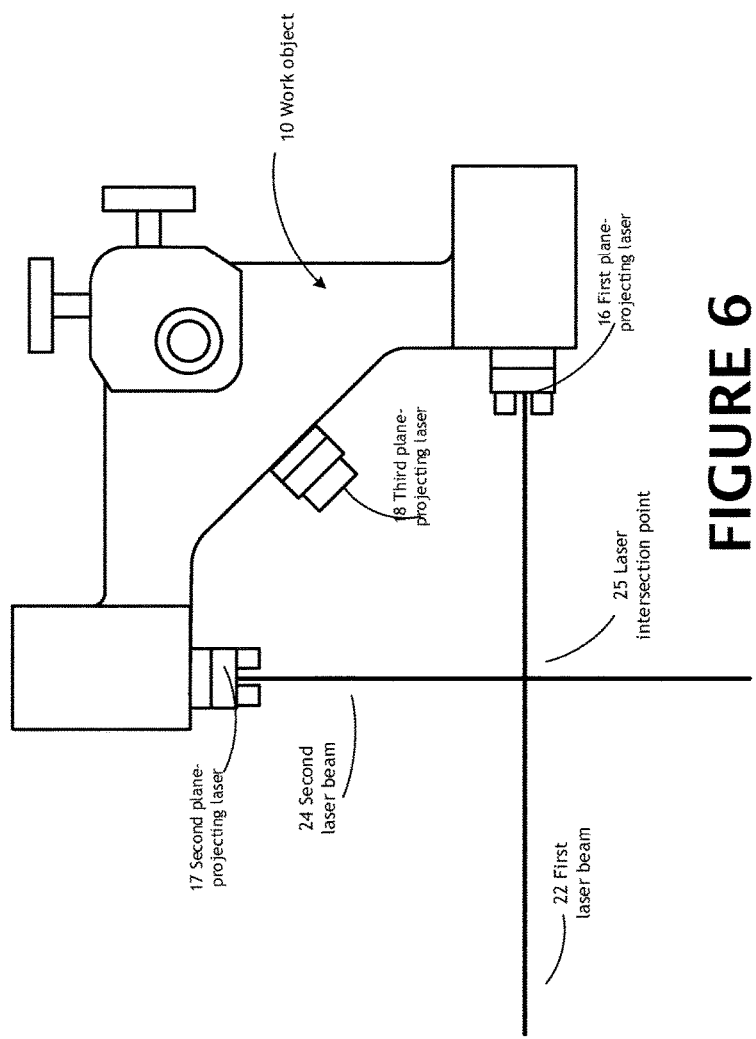
FIG. 6 is another perspective view of a first preferred embodiment of the work object of the present invention to calibrate a robot work path complete with three plane-projecting lasers complete with the two beam projecting lasers depicting two laser beams and a laser intersection point.
Figure 7:
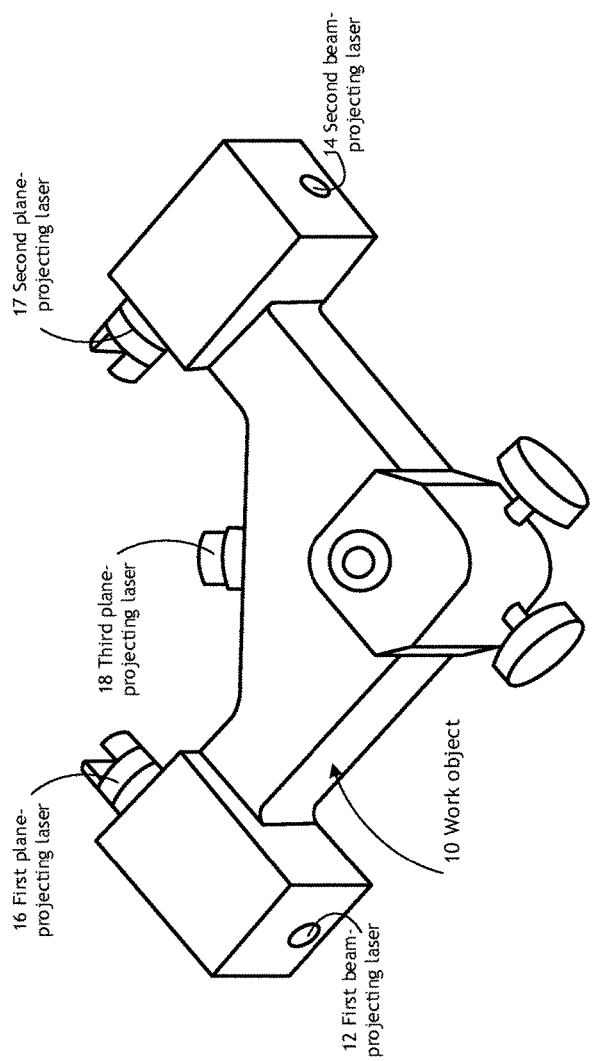
FIG. 7 is still another perspective view of a first preferred embodiment of the work object of the present invention to calibrate a robot work path complete with three plane-projecting lasers and two beam projecting lasers.
Figure 8B:
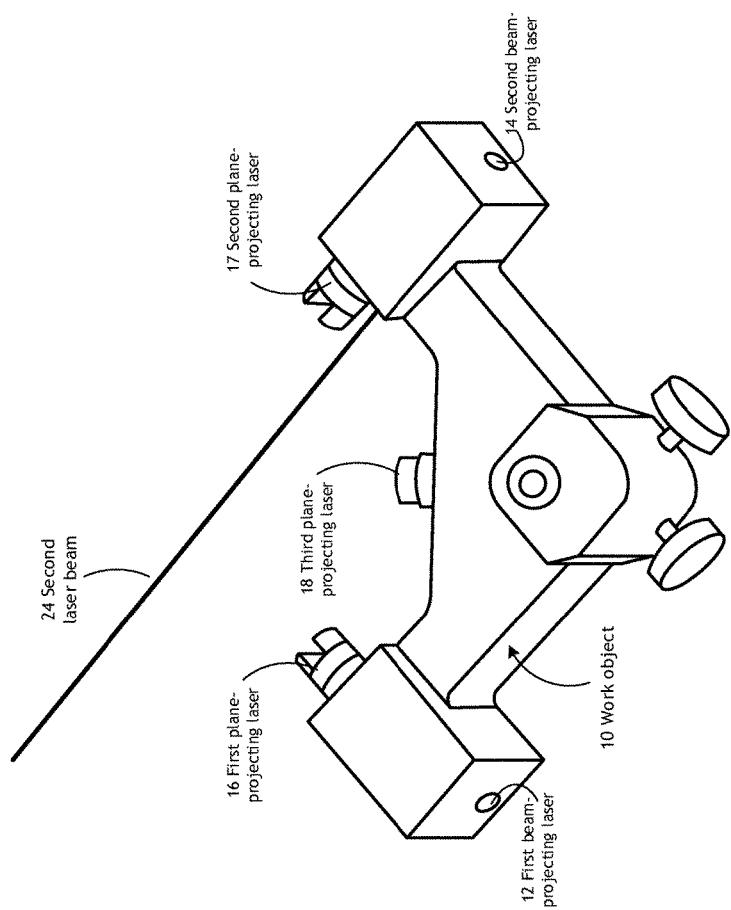
Figure 8C:
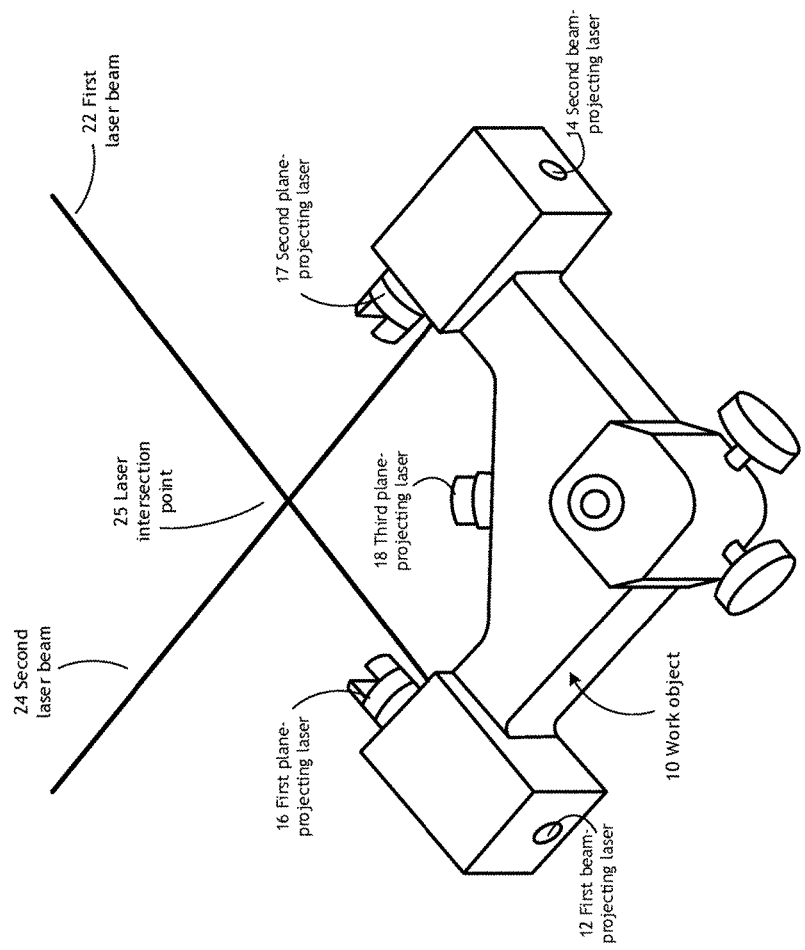
FIG. 8C is yet still another perspective view of the work object of FIG. 7, complete with three plane-projecting lasers and two beam projecting lasers, this view showing both the first and second beam projecting lasers on and the laser intersection point.
Figure 9:
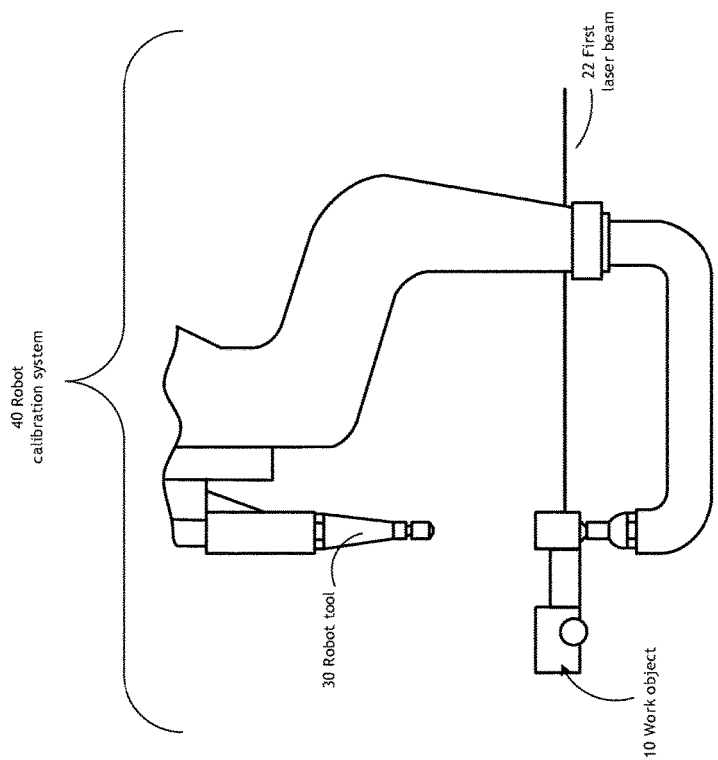

FIG. 5A depicts a perspective view of the first preferred embodiment of the robot calibration system of the present invention [35], the system comprising a robot tool and the work object of FIG. 1A. The robot tool [30] is a tool used in any number of manufacturing applications including, but not limited to, spot welding, material handling, MIG welding, assembly, cutting, painting and coating, and polishing and finishing. FIG. 5B depicts a perspective view of the second preferred embodiment of the robot calibration system of the present invention [135], the system comprising a robot tool and the work object of FIG. 1B.

Figure 10A:
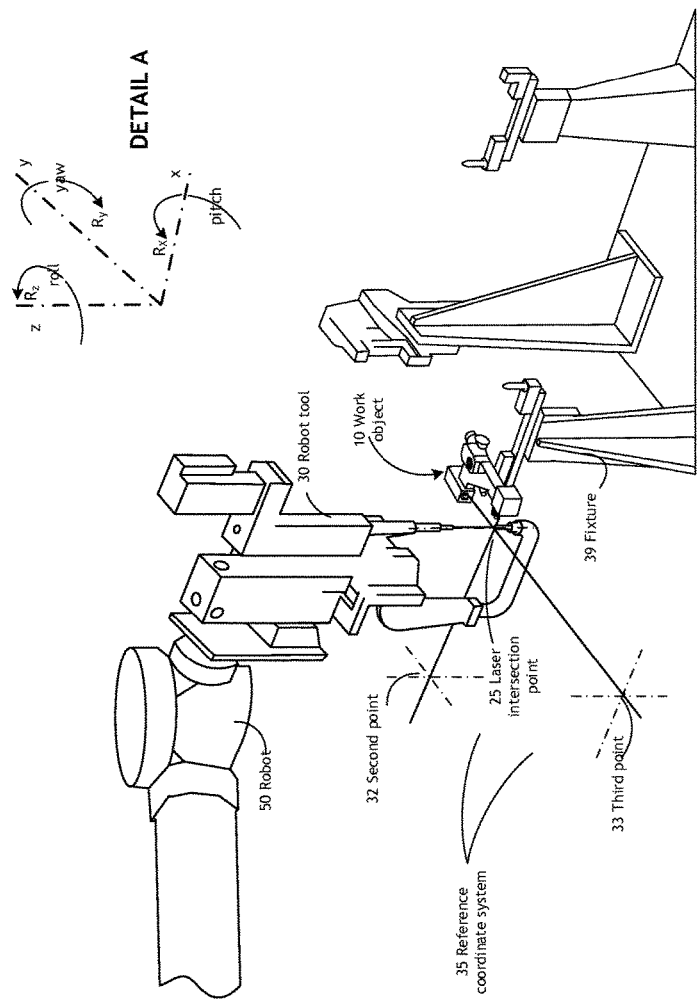
FIG. 10A depicts a perspective view of the robot calibration system of the present invention to calibrate a robot work path of FIG. 5A, with the work object positioned on a fixture, with the robot tool being positioned with respect to the laser intersection point of the work object. "DETAIL A" is a simplified representation of the angular positions ($R_x$, $R_y$, and $R_z$) and axes of the robot tool that are adjustable by the robot calibration system of the present invention.

FIG. 10A depicts the robot calibration system of the present invention as installed on a manufacturing shop floor, preferably an automotive shop floor. The technology enables the user to visually see a reference coordinate system [35] (a frame in space that is relative to an industrial robot) that is otherwise abstract and cannot be seen. Enabling the user to visually see the reference coordinate system [35] on the manufacturing shop floor enables the user to adjust the reference coordinate system [35] to the manufacturing shop floor environment and, thereby, correct a robotic path or off-line program to obtain accuracy.

The work object of the present invention [10] includes two laser beams positioned onto a work piece or robot tool, at a known location with the two laser beams [22 and 24] intersecting at a 90° angle at a laser intersection point [25] and continuing to project outward.

Figure 10B:
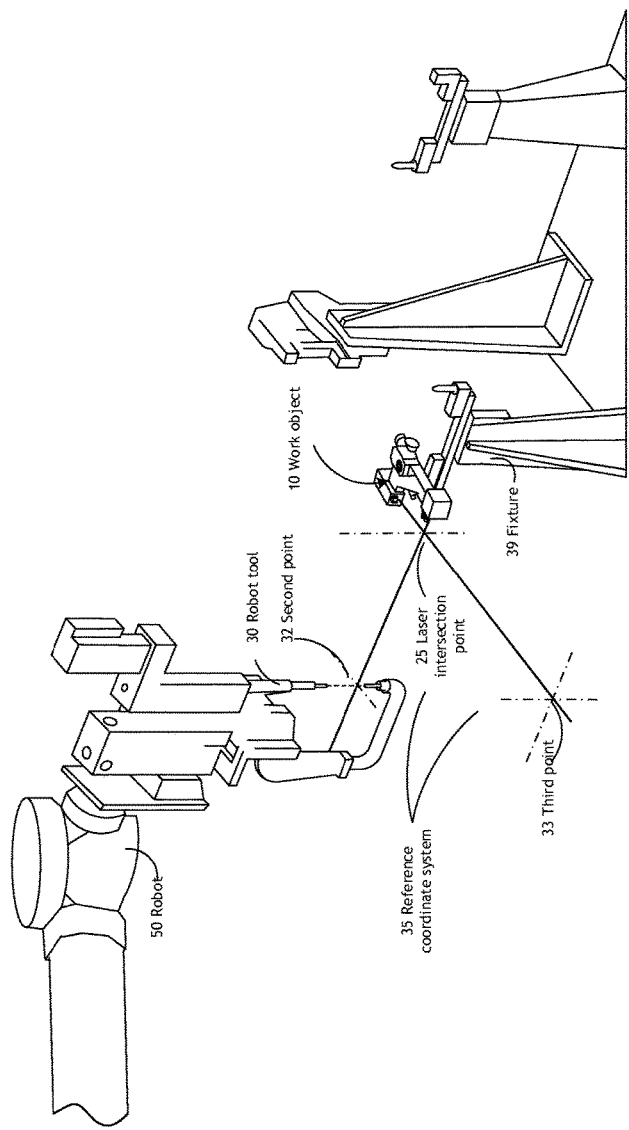
FIG. 10B depicts a second perspective view of the robot calibration system of FIG. 10A, with the work object of FIG. 1A still positioned on the fixture, with the robot tool being positioned at a second point along the axis of the first laser beam projected from the work object.
Figure 10C:
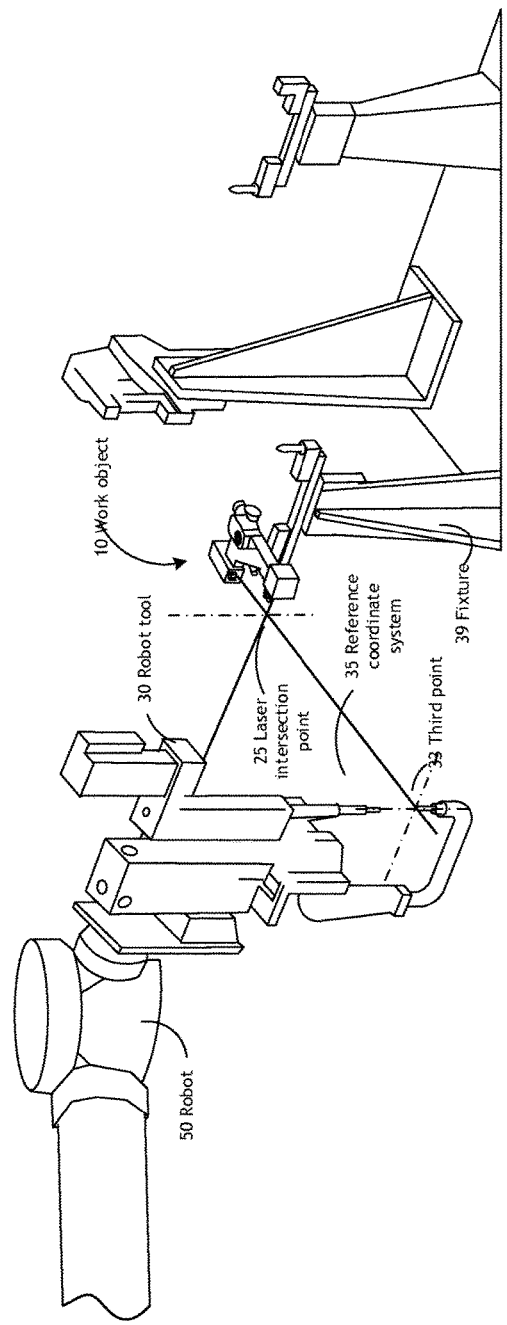
FIG. 10C depicts a third perspective view of the robot calibration system of FIG. 10A, with the work object of FIG. 1A still positioned on the fixture, with the robot tool being positioned at a third point along the axis of the second laser beam projected from the work object.

The laser intersection point [25] defines the correct location of the reference coordinate system [35], and is used to calibrate a robot work path on a manufacturing shop floor. To define the reference coordinate system [35], the robot will record a laser intersection point [26] at the intersection of the two (2) laser beams [22 and 24]. A second point [33] is then selected along the axis of the first laser beam [22] at a robot path tag [75] (see FIG. 10B). A third point [25] is then selected along the axis of the second laser beam [24] at another robot path tag [75] (see FIG. 10C).

In other words, the reference coordinate system [35] is defined by the two intersecting laser beams [22 and 24]. Once all three points [25, 32, and 33] are known, the reference coordinate system [35] is generated. The reference coordinate system is then used to adjust the angular position of the robot tool [30], which enables adjustment of roll, yaw, pitch, roll and yaw; roll and pitch; yaw and pitch; or roll, yaw, and pitch of said robot tool [30]. This method is applicable to all robotic processes including, but not limited to, spot welding, material handling, MIG welding, assembly, cutting, painting and coating, and polishing and finishing.

Using computer-aided design (CAD) simulation software, the user selects a position on the tool that is best suited to avoid crashes with other tooling and for ease of access for the robot or end-of-arm tooling. The off-line programs are then downloaded relative to the work object [10]. The work object [10] preferably mounts onto a fixture [39] using an NC block or standard NAAMS hole pattern mount [47]. The mounts are preferably laser cut to ensure the exact matching of hole sizes for the mounting of parts. The robot technician then manipulates the robot tool [30] into the work object [10] and positions it with respect to with the laser beams [22 and 24] to obtain the difference between the CAD world and manufacturing shop floor. This difference is then entered into the robot [50] and used to define the new reference coordinate system [35]. This calibrates the off-line programs and defines the distance and orientation of the robot tool [30], fixture [39], and peripherals.

The off-line programming with the work object [10] on the fixture [39] enable the work object of the present invention [10] to be touched up to the "real world position" of the fixture [39] relative to the robot [50]. If the fixture [39] ever needs to be moved or is accidently bumped, the user can simply touch up the work object of the present invention [10] and the entire path shifts to accommodate the change.

The first and second laser beams [22 and 24] are projected onto known features of the robot tool [30], and then used to calibrate the path of the robot tool [30] and measure the relationship of the fixture [39] relative to the robot tool [30].

The work object has a zero point, a zero coordinate system, and a zero theoretical coordinate system in space, which is positioned on the fixture [39].

The work object of the present invention [110] is placed onto the fixture [39], visually enabling the laser intersection point [25] of the robot tool [30] to be orientated into the work object [110] obtaining the "real-world" relationship of the robot tool [30] to the fixture [39] while updating the work object [110] to this "real-world" position.

The work object of the present invention [110] requires that its position correlate with the position of the robot tool [30] to calibrate the path of the robot tool [30] while acquiring the "real-world" distance and orientation of the fixture [39] relative to the robot tool [30]. The work object [110] must have a well-defined location on the manufacturing shop floor, and its position relative to the fixture [39] must be known.

The work object of the present invention [110] is used to calibrate a "known" calibration device or reference coordinate system (robotic simulation CAD software provided calibration device). The robotic calibration method of the present invention works by projecting laser beams to a known X, Y, and Z position and defining known geometric planes used to adjust the roll, yaw, and pitch of the robot tool [30] relative to the tool center point.

The laser beams [22 and 24] are projected onto the end of the robot tool [30] (weld gun, material handler, MIG torch, etc.) where the user will manipulate the robot with end-of-arm tooling into the laser beams [22 and 24] to obtain the positional difference between the "known" off-line program (simulation provided calibration device) and the actual (manufacturing shop floor) calibration device. The reverse is also true. For instance, a material handler robot can carry the work object of the present invention [10] to a known work piece with known features.

Using CAD simulation software, the CAD user selects a position on the tool to place the robotic work object calibration system that is best suited to avoid crashes with other tooling and for ease of access for the robot [50] or end-of-arm tooling. The laser intersection point [25] defines the correct location of the reference coordinate system [35], and is used to calibrate a robot work path on a manufacturing shop floor. The work object emits two laser beams that intersect at a laser intersection point. The laser intersection point acts as a crosshairs. The laser intersection point is selected to be the origin of the robot path being downloaded from the off-line programming. Once this off-line programming is created, the robot tool is then placed in the fixture on the shop floor in the same place as the CAD environment. The user then manipulates the TCP into position of the laser intersection point [25] and laser planes [26, 27, and 28]. The laser intersection point [25] is recorded. The robot is then manipulated down the laser beam [22] with the TCP recording the "X" elongator of the reference coordinate system [35] recording a second point [32] in the robot. A third point [33] is then recorded repeating the process along the opposing laser beam. Once all three (3) points are known, the reference coordinate system is generated.

The work object of the present invention [10] calibrates the paths to the robot [50] while involving the calibration of the peripherals of the robot [50].

The first laser plane enables adjustment of about a first angular position of said robot tool, a second laser plane enables adjustment of a second angular position of the robot tool, and a third laser plane enables adjustment of a third angular position of the robot tool once the reference coordinate system has been defined.

The coordinates and axes for calibrating the work path of the robot tool [30] are defined in three dimensions (X, Y, and Z) and relative to the rotational axes $R_x$ (pitch), $R_y$ (yaw), and $R_z$ (roll) as shown in DETAIL "A" (see FIG. 10A). The reference coordinate system [35] is then used to adjust the angular position of the robot tool [30], which can involve adjusting either roll and yaw, roll and pitch, yaw and pitch, or roll yaw and pitch of said robot tool [30]. This method is applicable for all robotic processes, including but not limited to, spot welding, material handling, MIG welding, assembly, cutting, painting and coating, and polishing and finishing.

Figure 11A:
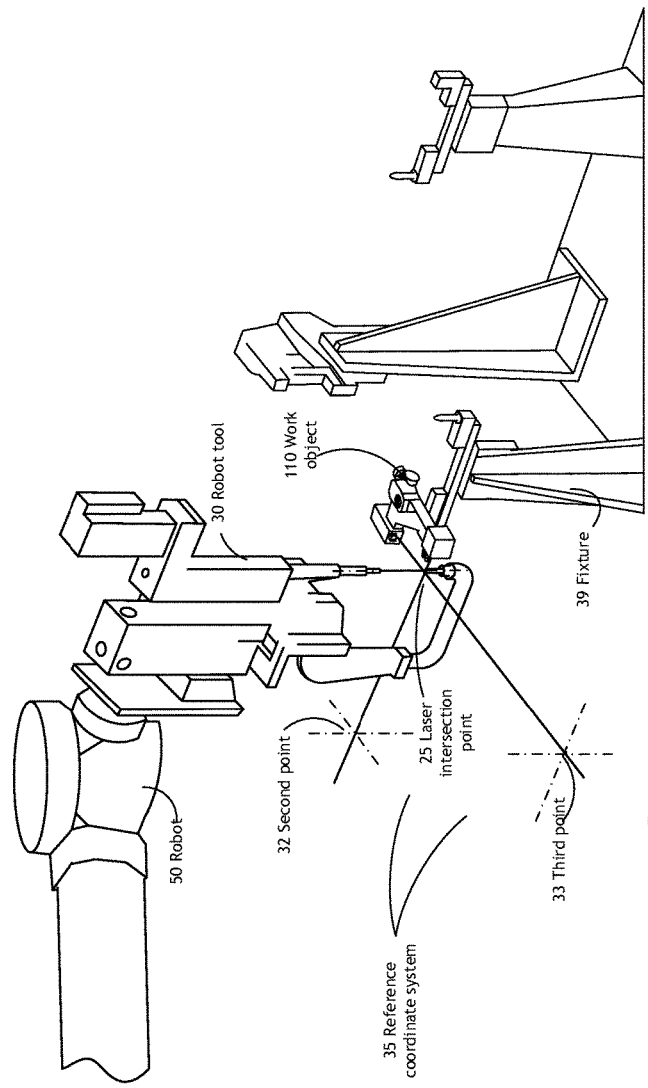
FIG. 11A depicts a perspective view of the robot calibration system of the present invention to calibrate a robot work path of FIG. 5B, with the work object 1B positioned on a fixture, with the robot tool being positioned with respect to the laser intersection point of the work object.

FIG. 11A depicts the robot calibration system of the present invention as installed on a manufacturing shop floor, preferably an automotive shop floor. The technology enables the user to visually see a reference coordinate system [35] (a frame in space that is relative to an industrial robot) that is otherwise abstract and cannot be seen. Enabling the user to visually see the reference coordinate system [35] on the manufacturing shop floor enables the user to adjust the reference coordinate system [35] to the manufacturing shop floor environment and, thereby, correct a robotic path or off-line program to obtain accuracy.

The work object of the present invention [110] includes two laser beams positioned onto a work piece or robot tool, at a known location with the two laser beams [22 and 24] intersecting at a 90° angle at a laser intersection point [25] and continuing to project outward.

Figure 11C:
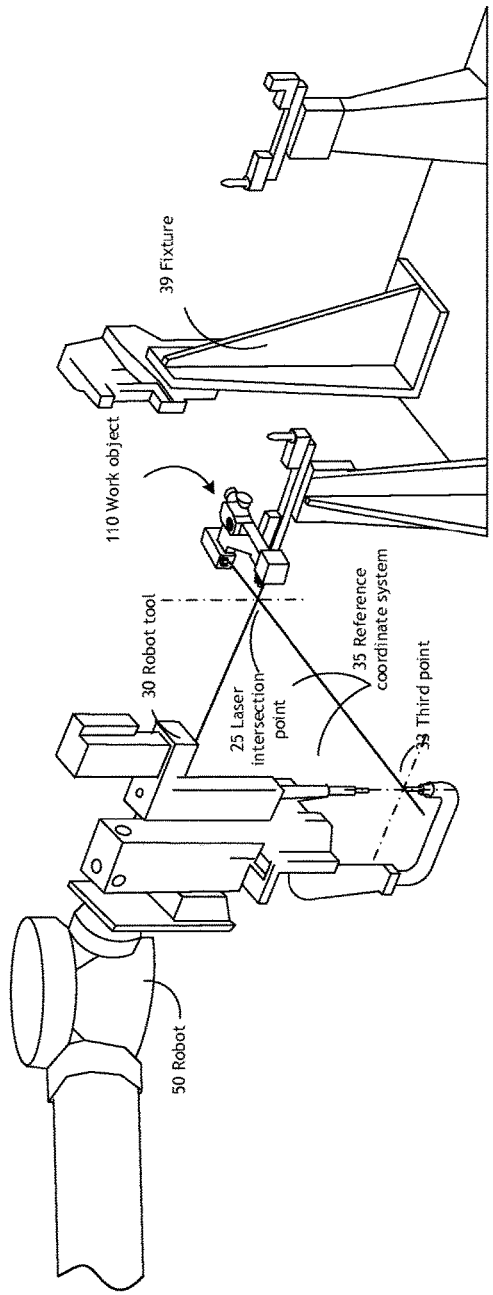
FIG. 11C depicts a third perspective view of the robot calibration system of FIG. 11A, with the work object of FIG. 1B still positioned on the fixture, with the robot tool being positioned at a third point along the axis of the second laser beam projected from the work object.

The laser intersection point [25] defines the correct location of the reference coordinate system [35], and is used to calibrate a robot work path on a manufacturing shop floor. To define the reference coordinate system [35], the robot will record a laser intersection point [25] at the intersection of the two (2) laser beams [22 and 24]. A second point [32] is then selected along the axis of the first laser beam [22] at a robot path tag [75] (see FIG. 11B). A third point [33] is then selected along the axis of the second laser beam [24] at another robot path tag [75] (see FIG. 11C).

In other words, the reference coordinate system [35] is defined by the two intersecting laser beams [22 and 24]. Once all three points [25, 32, and 33] are known, the reference coordinate system [35] is generated. The reference coordinate system is then used to adjust the angular position of the robot tool [30], which enables adjustment of roll, yaw, pitch, roll and yaw; roll and pitch; yaw and pitch; or roll, yaw, and pitch of said robot tool [30]. This method is applicable to all robotic processes including, but not limited to, spot welding, material handling, MIG welding, assembly, cutting, painting and coating, and polishing and finishing.

Using computer-aided design (CAD) simulation software, the user selects a position on the tool that is best suited to avoid crashes with other tooling and for ease of access for the robot or end-of-arm tooling. The laser intersection point [25] defines the correct location of the reference coordinate system [35], and is used to calibrate a robot work path on a manufacturing shop floor. The work object emits two laser beams that intersect at a laser intersection point. The laser intersection point acts as a crosshairs. The laser intersection point is selected to be the origin of the robot path being downloaded from the off-line programming. Once this off-line programming is created, the robot tool is then placed in the fixture on the shop floor in the same place as the CAD environment. The user then manipulates the TCP into position of the laser intersection point [25] and laser planes [26, 27, and 28]. The laser intersection point [25] is recorded. The robot is then manipulated down the laser beam [22] with the TCP recording the "X" elongator of the reference coordinate system [35] recording a second point [32] in the robot. A third point [33] is then recorded repeating the process along the opposing laser beam. Once all three (3) points are known, the reference coordinate system is generated.

The off-line programming with the work object [110] on the fixture [39] enable the work object of the present invention [110] to be touched up to the "real world position" of the fixture [39] relative to the robot [50]. If the fixture [39] ever needs to be moved or is accidently bumped, the user can simply touch up the work object of the present invention [110] and the entire path shifts to accommodate the change.

The first and second laser beams [22 and 24] are projected onto known features of the robot tool [30], and then used to calibrate the path of the robot tool [30] and measure the relationship of the fixture [39] relative to the robot tool [30].

The work object [20] has a zero point, a zero coordinate system, and a zero theoretical coordinate system in space, which is positioned on the fixture [39].

The work object of the present invention [110] is placed onto the fixture [39], visually enabling the laser intersection point [25] of the robot tool [30] to be orientated into the work object [110] obtaining the "real-world" relationship of the robot tool [30] to the fixture [39] while updating the work object [110] to this "real-world" position.

The work object of the present invention [110] requires that its position correlate with the position of the robot tool [30] to calibrate the path of the robot tool [30] while acquiring the "real-world" distance and orientation of the fixture [39] relative to the robot tool [30]. The work object [110] must have a well-defined location on the manufacturing shop floor, and its position relative to the fixture [39] must be known.

The work object of the present invention [110] is used to calibrate a "known" calibration device or reference coordinate system (robotic simulation CAD software provided calibration device). The robotic calibration method of the present invention works by projecting laser beams to a known X, Y, and Z position and defining known geometric planes used to adjust the roll, yaw, and pitch of the robot tool [30] relative to the tool center point.

The laser beams [22 and 24] are projected onto the end of the robot tool [30] (weld gun, material handler, MIG torch, etc.) where the user will manipulate the robot with end-of-arm tooling into the laser beams [22 and 24] to obtain the positional difference between the "known" off-line program (simulation provided calibration device) and the actual (manufacturing shop floor) calibration device. The reverse is also true. For instance, a material handler robot can carry the work object of the present invention [110] to a known work piece with known features.

Using CAD simulation software, the CAD user selects a position on the tool to place the robotic work object calibration system that is best suited to avoid crashes with other tooling and for ease of access for the robot [50] or end-of-arm tooling. The laser intersection point [25] defines the correct location of the reference coordinate system [35], and is used to calibrate a robot work path on a manufacturing shop floor. The work object emits two laser beams that intersect at a laser intersection point. The laser intersection point acts as a crosshairs. The laser intersection point is selected to be the origin of the robot path being downloaded from the off-line programming. Once this off-line programming is created, the robot tool is then placed in the fixture on the shop floor in the same place as the CAD environment. The user then manipulates the TCP into position of the laser intersection point [25] and laser planes [26, 27, and 28]. The laser intersection point [25] is recorded. The robot is then manipulated down the laser beam [22] with the TCP recording the "X" elongator of the reference coordinate system [35] recording a second point [32] in the robot. A third point [33] is then recorded repeating the process along the opposing laser beam. Once all three (3) points are known, the reference coordinate system is generated.

The work object of the present invention [110] calibrates the paths to the robot [50] while involving the calibration of the peripherals of the robot [50].

The work object of the present invention [110] aids in the kitting, or reverse engineering, of robotic systems for future use in conjunction with robotic simulation software. This enables integrators the ability to update their simulation CAD files to the "real world" positions.

The technology uses existing body-in-white procedures, personal computers and software and ways of communicating information amongst the trades.

The first laser plane enables adjustment of about a first angular position of said robot tool, and a second laser plane enables adjustment of a second angular position of the robot tool once the reference coordinate system has been defined.

Figure 12:
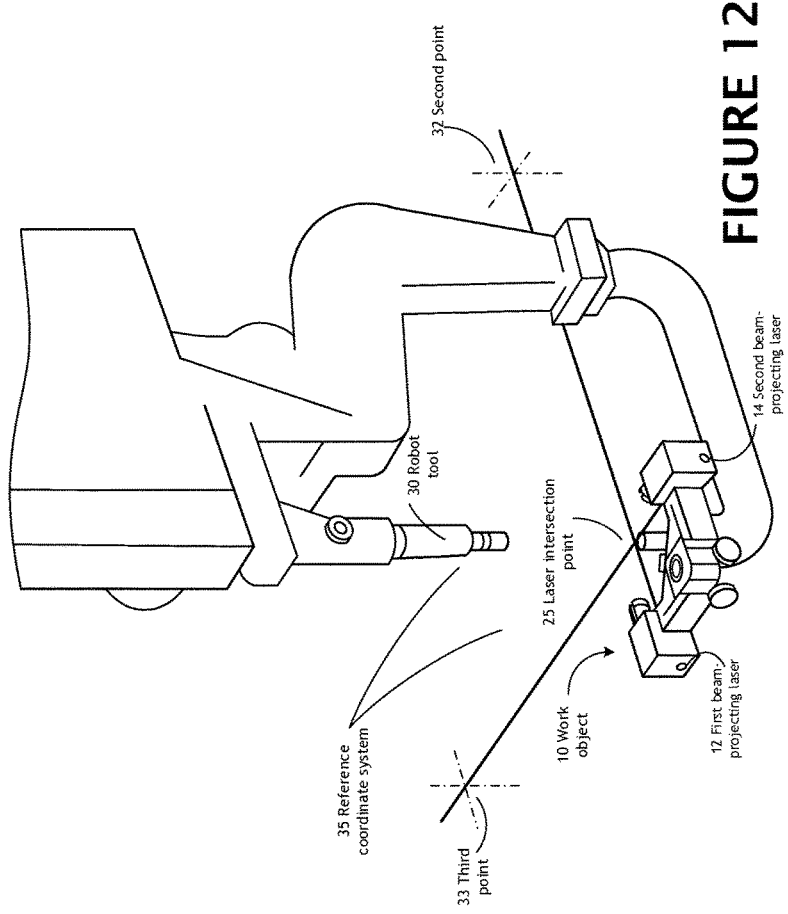
FIG. 12 depicts another perspective view of the first preferred embodiment of the robot calibration system of the present invention to calibrate a robot work path, with the work object of FIG. 1A and the robot tool being positioned with respect to the laser intersection point of the work object.

FIG. 12 depicts another perspective view of the first preferred embodiment of the robot calibration system [35] of the present invention, with the work object of the present invention [10] and the robot tool [30] positioned with respect to the laser intersection point [25] of the work object.

Using CAD simulation software, the CAD user selects a position on the tool to place the robotic work object calibration system that is best suited to avoid crashes with other tooling and for ease of access for the robot [50] or end-of-arm tooling. The laser intersection point [25] defines the correct location of the reference coordinate system [35], and is used to calibrate a robot work path on a manufacturing shop floor. The work object emits two laser beams that intersect at a laser intersection point. The laser intersection point acts as a crosshairs. The laser intersection point is selected to be the origin of the robot path being downloaded from the off-line programming. Once this off-line programming is created, the robot tool is then placed in the fixture on the shop floor in the same place as the CAD environment. The user then manipulates the TCP into position of the laser intersection point [25] and laser planes [26, 27, and 28]. The laser intersection point [25] is recorded. The robot is then manipulated down the laser beam [22] with the TCP recording the "X" elongator of the reference coordinate system [35] recording a second point [32] in the robot. A third point [33] is then recorded repeating the process along the opposing laser beam. Once all three (3) points are known, the reference coordinate system is generated.

The calibration device of the present invention [10] can be used in any of the following applications:
1. To teach TCP's (Tool Center Point).
2. To calibrate OLP's (Offline Programs).
3. To reverse engineer location of the robot relative to adjacent tooling.
4. To move existing robotic equipment without re-teaching the robots path once moved into the robot and tooling desired location.

For teaching a TCP; the work object [10] is positioned in any manner that a robots tool (WeldGun, Torch, Endeffector, Mig Welder, or the like) can reach without obstruction into the laser intersection point. The user then teaches the TCP using the standard practices of teaching a TCP while using the laser intersection point [25] as a reference point. Using the laser light removes the risk of bumping an object (matter) and therefore decreasing accuracy. The laser "light" being emitted cannot be bumped increasing accuracy and time.

To calibrate off-line programming; the object is placed into a robotic simulation CAD software system (Robcad, Process Simulate, Delmia, RoboGuide, RobotStudio, or similar type system). The user selects the location of the device and typically placed on a standard NAAMS block or pin in the tool or fixture the robot is interacting with. The laser intersection point [25] and laser planes [26, 27, and 28] represent the location of the reference coordinate system [35]. This reference coordinate system [35] is selected to be the origin of the robot path being downloaded from the off-line programming. Once this off-line programming is created, the device is then placed in the fixture on the shop floor in the same place as the CAD environment. The user then manipulates the TCP into position of the laser intersection point [25] and laser planes [26, 27, and 28]. The laser intersection point is recorded. The robot is then manipulated down the laser beam [22] with the TCP recording the "X" elongator of the reference coordinate system [35] recording a second point [32] in the robot. A third point [33] is then recorded repeating the process along the opposing laser beam.

To use the work object of the present invention [10] in the capacity of reverse engineer the location of the robot relative to adjacent tooling; the work object [10] is placed anywhere in a fixture [39] on the shop floor or manufacturing environment where the robot is able to reach and clear of obstruction so that the TCP can be manipulated into the laser intersection point [25]. This position is recorded using the TCP. This location can then be uploaded into a robotic simulation CAD software system (Robcad, Process Simulate, Delmia, RoboGuide, RobotStudio, or the like) along with the device into CAD. The robot and adjacent tooling are then be moved into position as represented in the manufacturing environment.

The work object of the present invention [10] can be used to move existing robotic equipment without re-teaching the robots path once moved into the robot and tooling desired location. The work object [10] is placed anywhere onto a fixture [39] on the shop floor or manufacturing environment where the robot is able to reach and clear of obstruction so that the TCP can be manipulated into the laser intersection point [25]. This position is recorded using the TCP. The laser planes [26, 27, and 28] are then transferred onto the robots tool [30] (WeldGun, Torch, Endeffector, Mig Welder, or the like) with some sort of a marker, pencil, or scribing tool. Once the robot or adjacent tooling is moved to a desired location, the TCP is then again manipulated into the laser intersection point [25] and the scribe lines, marker or pencil markings are then repositioned relative to the laser planes [26, 27, and 28]. A position is then recorded and compared to the first. The difference is then entered into the robot and the path is recalibrated.

The robot calibration systems of the present invention as described herein are compatible with robotic simulation packages, including but not limited to, Robcad® which is a registered trademark of Tecnomatix Technologies Ltd., Delmia® which is a registered trademark of Dassault Systèmes, Roboguide® which is a registered trademark of Fanuc Ltd. Corp., and RobotStudio® which is a registered trademark of ABB Corp.

The work object of the present invent [10] can be used to reverse engineer the location of the robot relative to adjacent tooling. The work object of the present invention can also be used to move existing robotic equipment without re-teaching the robots path once moved into the robot and tooling desired location.

The work object emits two laser beams that intersect at a laser intersection point. The laser intersection point acts as a crosshairs. Once in position, the TCP and laser intersection point resultantly reside in the same location. Once the location of the reference coordinate system is defined, the plane-projecting lasers are used to adjust the yaw, pitch, and roll of the robot tool relative to the tool center point (TCP).

Throughout this application, various Patents and Applications are referenced by number and inventor. The disclosures of these Patents/Applications in their entireties are hereby incorporated by reference into this specification in order to more fully describe the state of the art to which this invention pertains.

It is evident that many alternatives, modifications, and variations of the robot calibration systems of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10. Work object (1$^{st}$ embodiment)
12. First beam-projecting laser
14. Second beam-projecting laser
16. First plane projecting laser
17. Second plane projecting laser
18. Third plane projecting laser
22. First laser beam
24. Second laser beam
25. Laser intersection point
26. First laser plane
27. Second laser plane
28. Third laser plane
30. Robot Tool
32. Second point
33. Third point
35. Reference coordinate system (1$^{st}$ embodiment)
39. Fixture
40. Robot calibration system
46. Wedge
47. NC block or NAAMS mount
50. Robot
110. Work object (2$^{nd}$ embodiment)
135. Robot calibration system (2$^{nd}$ embodiment)
210. Work object (3$^{rd}$ embodiment)

I claim:

1. A work object for calibrating a robot work path on a manufacturing shop floor relative to a robot tool using CAD simulation software, said work object comprising:
   a. a first laser mounted on said work object, said first laser projecting a first laser beam relative to said robot tool;
   b. a second laser mounted on said work object, said second laser projecting a second laser beam relative to said robot tool, said second laser beam intersecting said first laser beam at a laser intersection point;
   c. a first and second plane-projecting lasers, said first plane projecting laser projecting a first laser plane, said second plane projecting laser projecting a second laser plane, said first and second laser planes intersecting each other;
   whereby a reference coordinate system is defined by said laser intersection point, a second point disposed along said first laser beam other than said laser intersection point, and a third point disposed along said second laser beam other than said laser intersection point, calibration of said robot work path deploying said reference coordinate system; and
   whereby said first and second laser planes enable adjustment of angular positions of said robot tool on said manufacturing shop floor relative to said reference coordinate system.

2. The work object of claim 1, wherein said first and second laser beams intersect at a 90 degree angle.

3. The work object of claim 1, wherein said first and said second laser planes intersect at a 90 degree angle.

4. The work object of claim 1, further comprising a third plane-projecting laser, said third plane projecting laser projecting a third laser plane.

5. The work object of claim 4, wherein said first laser plane enables adjustment of Rx angular position of said robot tool, said second laser plane enables adjustment of Ry angular position of said robot tool, and said third laser plane enables adjustment of Rz angular position of said robot tool.

6. The work object of claim 1, wherein said work object is mountable onto a fixture on a manufacturing shop floor using a numerical control block or a NAAMS hole-pattern mount.

7. A method for calibrating a robot work path on a manufacturing shop floor, said calibration system including a work object, said work object including a first and a second laser, said first laser projecting a first laser beam, said second laser projecting a second laser beam, said first laser beam intersecting said second laser beam at a laser intersection point, said work object including a first and a second plane projecting laser, said first plane projecting laser projecting a first laser plane, said second plane projecting laser projecting a second laser plane, said first and said second laser planes intersecting each other, the method comprising:
   a. securely mounting said work object onto a fixture relative to a robot tool, said fixture being positioned on said manufacturing shop floor;
   b. generating a reference coordinate system, said reference coordinate system including said first and said second laser beams;
   c. enabling a manipulation of said robot tool into alignment with said laser intersection point, an offline program being downloadable relative to said work object when said work object is placed onto said robot tool in a position defined by CAD simulation software on said manufacturing shop floor, thereby enabling calibration of said robot work path for said robot tool relative to said laser intersection point when said work object is mounted onto said fixture;

d. using said reference coordinate system to calibrate said robot work path of said robot tool using CAD simulation software; and e. using said first and said second laser planes to adjust angular positions of said robot tool on said manufacturing shop floor relative to said reference coordinate system.

8. The method of claim 7, wherein said first and second laser beams intersect at a 90 degree angle.

9. The method of claim 7, wherein said first and said second laser planes intersect at a 90 degree angle.

10. The method of claim 7, further comprising a third plane-projecting laser, said third plane projecting laser projecting a third laser plane.

11. The method of claim 10, wherein said first laser plane enables adjustment of Rx angular position of said robot tool, said second laser plane enables adjustment of Ry angular position of said robot tool, and said third laser plane enables adjustment of Rz angular position of said robot tool.

12. The method of claim 7, wherein said work object is mountable onto a fixture using a numerical control block or a NAAMS hole-pattern mount.

13. A system for calibrating a robot work path on a manufacturing shop floor using CAD simulation software, the system comprising:

a. a robot tool positionable onto a robot; and b. a work object being mountable onto a fixture relative to said robot tool, said work object having a first and a second laser, said first laser emitting a first laser beam, said second laser emitting a second laser beam, said first laser beam intersecting said second laser beam at a laser intersection point, said laser intersection point defining a location of a reference coordinate system, said work object including a first and second plane-projecting lasers, said first plane projecting laser projecting a first laser plane, said second plane projecting laser projecting a second laser plane, said first and second laser planes intersecting each other, angular positions of said robot tool being adjustable on said manufacturing shop floor relative to said reference coordinate system.

14. The system of claim 13, wherein said first and said second laser beams intersect at a 90 degree angle.

15. The system of claim 13, wherein said first and said second laser planes intersect at a 90 degree angle.

16. The system of claim 13, further comprising a third plane-projecting laser, said third plane projecting laser projecting a third laser plane.

17. The system of claim 13, wherein said work object is mountable onto a fixture using a numerical control block or NAAMS hole-pattern mount.

18. The system of claim 16, wherein said first laser plane enables adjustment of Rx angular position of said robot tool, said second laser plane enables adjustment of Ry angular position of said robot tool, and said third laser plane enables adjustment of Rz angular position of said robot tool.

19. The system of claim 16, further comprising a said third plane projecting laser projecting a third laser plane.

20. The system of claim 16, wherein said reference coordinate system is defined by said laser intersection point, a second point disposed along said first laser beam other than said laser intersection point, and a third point disposed along said second laser beam other than said laser intersection point, calibration of said robot work path deploying said reference coordinate system.

* * * * *